United States Patent Office 3,231,599
Patented Jan. 25, 1966

3,231,599
BICYCLIC CARBAMYLOXIMES
John R. Kilsheimer, Westfield, N.J., and David T. Manning, South Charleston, W. Va., assignors to Union Carbide Corporation, a corporation of New York
No Drawing. Filed Sept. 22, 1961, Ser. No. 139,892
13 Claims. (Cl. 260—464)

This invention relates to new chemical compounds and to pesticidal compositions containing them. More particularly, the invention relates to certain N-methylcarbamyloximes of bicyclic ketones and to pesticidal compositions containing the same.

The novel compounds of this invention comprise substituted and unsubstituted bicyclo[2.2.1]heptan-2-one N-methylcarbamyloximes and bicyclo[2.2.1]-5-hepten-2-one N-methylcarbamyloximes. Generally, the novel compounds of this invention can be represented by the formula:

(I) 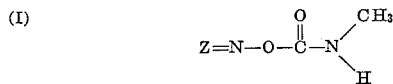

wherein Z is a divalent radical selected from the group consisting of

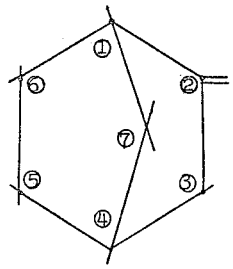

and

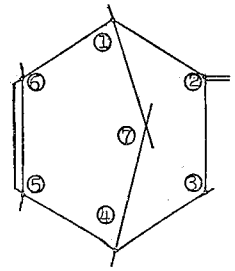

wherein the free valences of ring carbon atoms numbered 1, 3, 4, 5, 6, and 7 are satisfied by members selected from the group consisting of hydrogen atoms, halogen atoms, and organic radicals, but where the molecular weight of said compounds does not exceed 600.

More particularly contemplated are compounds wherein said organic radicals are selected from the group consisting of alkyl radicals, alkenyl radicals, alkoxy radicals, aryl radicals, substituted aryl radicals, aralkyl radicals, haloalkyl radicals, cyano radicals, alkylmercapto radicals, arylmercapto radicals, alkoxyalkyl radicals, acyloxy radicals, thiocyanato radicals, carboxy radicals, carbamoyl radicals, N-alkylcarbamoyl radicals, N,N-dialkylcarbamoyl radicals, alkoxycarbonyl radicals, aryloxycarbonyl radicals, N-alkylcarbamoyl radicals, N,N-dialkylcarbamoyl radicals, alkoxycarbonyl radicals, aryloxycarbonyl carboximidoyl radicals, alkylthiocarboximidoyl radicals, arylthiocarboxyimidoyl radicals, N-alkylamidino radicals, N-arylamidino radicals, N-alkylthiocarbamylmercapto radicals, N,N-dialkylthiocarbamylmercapto radicals, nitro radicals, and nitrito radicals. Of particular interest are those compounds in which said organic radical is attached to the 3, 5 or 6 positions.

Compounds particularly preferred because of their outstanding pesticidal activity can be represented by the following general formula:

(II) 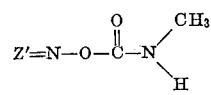

wherein Z' is selected from the group consisting of

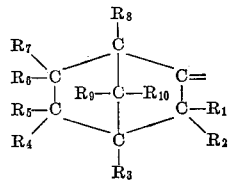

and

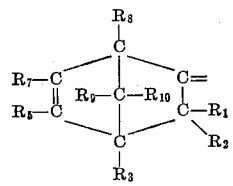

and wherein $R_1$ is selected from the group consisting of hydrogen atoms, chlorine atoms, lower alkyl radicals, dimethylamino radicals, N-methylthiocarbamylmercapto radicals, N,N-dimethylthiocarbamylmercapto radicals, thiocyanato radicals, and alkylmercapto radicals; $R_2$, $R_4$, $R_6$, $R_9$ and $R_{10}$ are selected from the group consisting of hydrogen atoms, chlorine atoms, and lower alkyl radicals; $R_3$ and $R_8$ are selected from the group consisting of hydrogen atoms, chlorine atoms, lower alkyl radicals, alkoxy radicals, cyano radicals, and alkylmercapto radicals; and $R_5$ and $R_7$ are selected from the group consisting of hydrogen atoms, chlorine atoms, lower alkyl radicals, lower alkenyl radicals, chloroalkyl radicals, alkoxy radicals, cyano radicals, alkylmercapto radicals, phenyl radicals, parachlorophenyl radicals, and carboxy radicals.

The particularly preferred compounds of this invention can be seen to comprise two general groups of compounds. One group can be represented by the general formula (III) 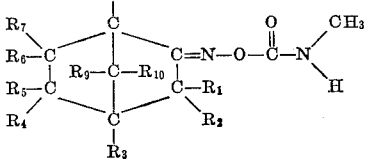

wherein the R radicals are defined as above.

Illustrative of the compounds of this group are bicyclo [2.2.1]heptan-2-one N-methylcarbamyloxime, 3-chlorobicyclo[2.2.1]heptan-2-one N-methylcarbamyloxime, 1-(or 4, 5, 6, or 7)chlorobicyclo[2.2.1]heptan-2-one N-methylcarbamyloxime, 3-(or 1, 4, 5, 6, or 7)methylbicyclo[2.2.1]heptan-2-one N-methylcarbamyloxime, 1-(or 4, 5, or 6)methoxy or ethoxy, propoxy, isopropoxy, isobutoxy[2.2.1]heptan-2-one N-methylcarbamyloxime, 1-(4, 5, or 6)cyanobicyclo[2.2.1]heptan-2-one N-methylcarbamyloxime, 3-(or 1, 4, 5, or 6)methylmercapto (or ethylmercapto, isopropylmercapto, or chlorophenylmercapto)bicyclo[2.2.1]heptan - 2 - one N - methylcarbamyloxime, 3-chloro-5(6)-methylbicyclo[2.2.1]heptan-2-one N-methylcarbamyloxime, 3-chloro-5(6)-methoxybicyclo [2.2.1]heptan-2-one N-methylcarbamyloxime, 3-chloro-5(6)-isobutoxybicyclo[2.2.1]heptan-2-one N-methylcarbamyloxime, 3-chloro-5(6)-cyanobicyclo[2.2.1]heptan-2-one N-methylcarbamyloxime, 3-chloro-5(6)-chloromethylbicyclo[2.2.1]heptan-2-one N-methylcarbamyloxime, 3-chloro-5(6)-methylmercaptobicyclo[2.2.1]heptan - 2 - one N-methylcarbamyloxime, 3 - chloro-5,5(6,6)-dimethylbicyclo[2.2.1]heptan-2-one N-methylcarbamyloxime, 3,4,5, 6 - tetrachlorobicyclo[2.2.1]heptan - 2 - one N-methylcarbamyloxime, 3-chloro-5-methylmercapto-7-methylbicyclo [2.2.1]heptan-2-one N-methylcarbamyloxime, 3-chloro-5(6)-isopropylbicyclo[2.2.1]heptan-2-one N - methylcarbamyloxime, 3-chloro-5(6)-vinylbicyclo[2.2.1]heptan-2-one N-methylcarbamyloxime, 3-chloro-5(6)-phenylbicyclo[2.2.1]heptan-2-one N-methylcarbamyloxime, 3-dimethylaminobicyclo[2.2.1]heptan - 2 - one N-methylcarbamyloxime, 3-chloro-5(6)-carboxybicyclo[2.2.1]heptan-2-one N-methylcarbamyloxime, 3,5(6)-dichlorobicyclo [2.2.1]heptan-2-one N-methylcarbamyloxime, 3-chloro-5,6-dichloromethylbicyclo[2.2.1]heptan-2-one N-methylcarbamyloxime, 3 - chloro - 5(6) - methoxymethylbicyclo [2.2.1]heptan-2-one N-methylcarbamyloxime, 3-chloro-5(6) - acetoxybicyclo[2.2.1]heptan - 2 - one N-methylcarbamyloxime, 3-(N-methylthiocarbamylmercapto)bicyclo [2.2.1]heptan-2-one N-methylcarbamyloxime, 3-(N,N'-dimethylthiocarbamylmercapto)bicyclo[2.2.1]heptan - 2-one N-methylcarbamyloxime, 3-thiocyanatobicyclo[2.2.1] heptan-2-one N-methylcarbamyloxime, and the like.

The second group of the particularly preferred compounds of this invention can be represented by the general formula (IV)

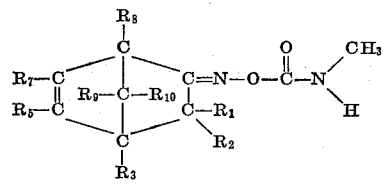

wherein the R radicals are defined as above.

Illustrative of the compounds of this group are bicyclo-[2.2.1]-5-hepten-2-one N-methylcarbamyloxime, 3-chlorobicyclo[2.2.1]-5-hepten-2-one N-methylcarbamyloxime, 1-(or 4, 5, 6 or 7)chlorobicyclo[2.2.1]-5-hepten-2-one N-methylcarbamyloxime, 3-methylbicyclo[2.2.1]-5-hepten-2-one N-methylcarbamyloxime, 1-(or 4, 5, 6 or 7)methylbicyclo[2.2.1]-5-hepten-2-one N-methylcarbamyloxime, 1-(or 4, 5 or 6)methoxy (or ethoxy, propoxy, isopropoxy, isobutoxy)bicyclo[2.2.1]-5-hepten-2-one N-methylbamyloxime, 1-(or 4, 5, or 6)cyanobicyclo[2.2.1]-5-hepten-2-one N-methylcarbamyloxime, 3-(or 1, 4, 5 or 6)methylmercapto (or ethylmercapto, isopropylmercapto, or chlorophenylmercapto)bicyclo[2.2.1] - 5 - hepten - 2 - one N-methylbicyclo[2.2.1]-5-hepten-2-one N-methylcarbamyloxime, 3-chloro-5(6)-methoxybicyclo[2.2.1]-5-hepten - 2 - one N-methylcarbamyloxime, 3-chloro-5(6)-isobutoxybicyclo[2.2.1]-5-hepten-2-one N-methylcarbamyloxime, 3 - chloro-5(6)-cyanobicyclo[2.2.1]-5-hepten-2-one N - methylcarbamyloxime, 3 - chloro - 5(6) - chloromethylbicyclo[2.2.1]-5-hepten-2-one N-methylcarbamyloxime, 3 - chloro-5(6)-methylmercaptobicyclo [2.2.1]-5-hepten-2-one N-methylcarbamyloxime, 3 - chloro-5,6-dimethylbicyclo[2.2.1]-5-hepten - 2 - one N-methylcarbamyloxime, 3,4,5,6-tetrachlorobicyclo[2.2.1]-5-hepten-2-one N - methylcarbamyloxime, 3 - chloro - 5 - methylmercapto-7-methylbicyclo[2.2.1]-5-hepten-2-one N-methylcarbamyloxime, 3-chloro-5(6)-isopropylbicyclo[2.2.1]-5-hepten-2-one N - methylcarbamyloxime, 3 - chloro - 5(6)-vinylbicyclo[2.2.1]-5-hepten-2-one N-methylcarbamyloxime, 3 - chloro - 5(6)-phenylbicyclo[2.2.1]-5-hepten-2-one N - methylcarbamyloxime, 3-dimethylaminobicyclo[2.2.1]-5-hepten-2-one N-methylcarbomyloxime, 3 - chloro - 5-(6)-carboxybicyclo-[2.2.1]-5-hepten-2-one N-methylcarbamyloxime, 3,5(6)-dichlorobicyclo[2.2.1]-5-hepten-2-one N-methylcarbamyloxime, 3 - chloro - 5(6)-dichloromethylbicyclo[2.2.1]-5-hepten-2-one N-methylcarbamyloxime, 3 - chloro - 5(6)-methoxymethylbicyclo[2.2.1]-5-hepten-2-one N - methylcarbamyloxime, 3 - chloro-5(6)-acetoxybicyclo[2.2.1]-5-hepten-2-one N-methylcarbamyloxime,3-(N - methylthiocarbamylmercapto)bicyclo[2.2.1] - 5 - hepten - 2-one N-methylcarbamyloxime, 3 - (N,N'-dimethylthiocarbamylmercapto)bicyclo[2.2.1]-5-hepten-2 - one N - methylcarbamyloxime, 3-thiocyanatobicyclo[2.2.1]-5-hepten-2-one N-methylcarbamyloxime, and the like.

The compounds of this invention can be prepared by the addition of methylisocyanate to their corresponding oximes. This reaction can be generally depicted as follows, where Z is defined as above.

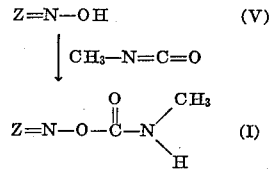

The reaction may be carried out, generally, by contacting the oxime (V) with methyl isocyanate in an inert organic solvent, and preferably in the presence of a tertiary amine or organotin catalyst.

The reaction may be effected at temperatures ranging from about 10° C. to about 130° C., and is preferably carried out between room temperature and about 80° C. Generally, temperatures in excess of about 130° C. are to be avoided in view of the temperature sensitivity of the product (I). The operating pressure may range from about 1 atmosphere to about 10 atmospheres, preferably from about 2 to about 3 atmospheres, and is dependent upon the concentration and vapor pressure of the particular volatile isocyanate used, at the reaction temperature.

The inert organic solvents that can be employed in the reaction are those inert to isocyanates in general, i.e. those not containing radicals such as hydroxy or amino radicals. Illustrative solvents are aliphatic and aromatic hydrocarbons, such as hexane, heptane, octane, benzene, toluene, and the like, and ethers such as diethyl ether, ethyl propyl ether, and the like.

The reaction is preferably carried out in the presence of a tertiary amine or organotin catalyst. The term "organotin catalyst" as used herein is meant to refer to such compounds as dibutyltin diacetate, dibutyltin dichloride, dibutyltin dimethoxide, dibutyltin dilaurate, dibutyltin maleate, dibutyltin di-2-ethylhexenoate, stannous octanoate, stannous oleate, and the like. Generally, amounts of said catalyst from about 0.1 to about 1.0 weight percent of the starting material comprised of methyl isocyanate and the oxime (V) are sufficient.

The mol ratio of methyl isocyanate to oxime (V) can range from about 0.25:1 to about 2:1, but preferably an equimolar amount or slight excess of methyl isocyanate is employed to insure that the oxime (V) is completely reacted.

The reaction time may vary from about 5 minutes to about 7 days, but normally, when operating in the preferred temperature range, reaction times of from about one-half hour to about five hours are sufficient for complete reaction.

The carbamyloxime product formed (I), either a solid or oily liquid, can be recovered from the reaction mixture by means known to the art, e.g. by vacuum-distillation to drive off solvent and excess isocyanate.

EXAMPLE I.—PREPARATION OF 3-CHLOROBICYCLO[2.2.1]HEPTAN-2-ONE N - METHYLCARBAMYLOXIME

In accordance with the general procedure, 20 grams (0.125 mole) of 3 - chlorobicyclo[2.2.1]heptan - 2 - one oxime, 8 grams (0.14 mole) of methyl isocyanate, 100 milliliters of anhydrous ethyl ether, and 0.1 gram of dibutyltin diacetate were charged to a pressure bottle. The bottle was allowed to stand for four days at room temperature. After the four-day period the ethyl ether solvent and excess reactants were removed from the reaction mixture by distillation to leave a solid residue product. The 3-chlorobicyclo[2.2.1]heptan-2-one N - methylcarbamyloxime product weighed 22 grams, corresponding to a yield of 81.5 percent of theory, and analyzed as follows:

|  | Nitrogen, percent |
| --- | --- |
| Calculated | 12.93 |
| Found | 12.99 |

EXAMPLE II.—PREPARATION OF 3-CHLOROBICYCLO[2.2.1]-5-HEPTENE - 2 - ONE N-METHYLCARBAMYOXIME

In accordance with the general procedure, 27 grams (0.171 mole) of 3-chlorobicyclo[2.2.1]-5-heptene-2-one oxime, 11 grams (0.193 mole) of methyl isocyanate, 100 milliliters of anhydrous ethyl ether, and 0.1 gram of dibutyltin diacetate were charged to a pressure bottle. The bottle was allowed to stand for three days at room temperature. After the three-day period, the solvent and excess isocyanate were removed from the reaction mixture by vacuum distillation to leave a solid residue product. The 3-chlorobicyclo[2.2.1]-5-hepten-2-one N-methylcarbamyloxime product weighed 33 grams, corresponding to a yield of 90 percent of theory, and analyzed as follows:

|  | Nitrogen, percent |
| --- | --- |
| Calculated | 13.05 |
| Found | 12.56 |

The oximes from which the carbamyloximes of this invention are prepared can be synthesized in various ways. For example, to prepare the bicyclo[2.2.1]heptan-2-one oximes, a usitably substituted cyclopentadiene can be reacted with a suitably substituted ethylene to give a substituted bicyclo[2.2.1]-2-heptene by the well-known Diels-Alder reaction. The substituted bicyclo[2.2.1]-2-heptene is converted to the corresponding bicyclo[2.2.1]-2-heptene nitrosochloride, by the addition of nitrosyl chloride, which is then rearranged to the corresponding 3-chlorobicyclo[2.2.1]heptan-2-one oxime. The conversion of substituted bicyclo[2.2.1]-2-heptene to its nitrosochloride is accomplished, generally, by dissolving the heptene in a low-boiling chlorinated hydrocarbon, such as methylene dichloride or carbon tetrachloride or a hydrocarbon, such as pentane, and slowly feeding nitrosyl chloride into the resulting solution in a mol ratio of from about 0.75:1 to 1.5:1, and preferably in a mol ratio of about 1.05:1, at a temperature between —50° C. and 25° C., and preferably between —5° C. and +5° C. The nitrosochloride product, which precipitates out as a white solid during the course of the reaction, exists in the stable dimeric form and may be separated from the reaction mixture by filtration. The nitrosochloride dimer is suspended in n-butanol and the resulting mixture is refluxed at atmospheric pressure for from about 10 minutes to two hours to give the corresponding 3-chlorobicyclo[2.2.1]heptan - 2 - one oxime which can be separated from the reaction mixture by vacuum-distilling to remove the solvent and purifying the residual oxime product by means known to the art.

The above-described preparation of the 3-chlorobicyclo [2.2.1]heptan-2-one oximes is disclosed more fully in copending applications Serial No. 139,882, in the names of H. A. Stansbury and D. T. Manning, filed on September 22, 1961, and Serial No. 99,989, in the names of D. T. Manning and H. A. Stansbury, filed on April 3, 1961.

The bicyclo[2.2.1]-5-hepten-2-one oximes can be prepared similarly by starting with the corresponding bicyclo [2.2.1]-2,5-heptadiene, adding nitrosyl chlroide, and rearranging to the oxime. The bicyclo[2.2.1]-2,5-heptadienes may be conveniently prepared by the Diels-Alder reaction in which acetylene or a substituted acetylene is added, as the dienophile, to cyclopentadiene or a substituted cyclopentadiene.

It is evident that the above-described procedure for making the carbamyloximes of this invention via their corresponding oximes results in compounds having a chlorine atom in the 3-position. If it is desired to make compounds having a different substituent, e.g. methyl, methoxy, isobutoxy, cyano, methylmercapto and the like, at the 3-position, the 3-chlorobicyclo[2.2.1]heptan-2-one oxime, prepared as described above, can be treated with for example, sodium alkoxides, sodium cyanide, sodium methyl mercaptide, and the like, by means known to the art, to replace said chlorine atom with the desired substituent.

An alternative procedure for making the bicyclic oximes which are employed in preparing the carbamyloximes of this invention is to treat the corresponding bicyclic ketone with hydroxylamine to give the desired oxime by means known to the art.

In addition, the hydroxyimino group may be introduced directly into substituted or unsubstituted bicyclo[2.2.1] heptanes by the light-catalyzed reaction of the latter with nitrosyl chloride. This method was employed, for example, in the preparation of bicyclo[2.2.1.]-2-heptanone oxime. The bicyclo[2.2.1]heptanes may be obtained by catalytic hydrogenation of the corresponding bicyclo [2.2.1.]-2-heptenes or bicyclo[2.2.1]-2,5-heptadienes.

The following example is illustrative of a method for preparing the oximes used in preparing the carbamyloximes of this invention.

EXAMPLE III.—PREPARATION OF 3-CHLOROBICYCLO[2.2.1]HEPTAN-2-ONE OXIME 388 grams (4.13 moles) of bicyclo[2.2.1]-2-heptene were dissolved in 2800 milliliters of carbon tetrachloride. 278 grams (4.25 moles) of nitrosochloride were added, with stirring, over a period of 2 hours, while maintaining a reaction temperature of —4° to 0° C. A heavy white precipitate produced was separated from the pale blue-green solution by suction filtration. The crude filter cake was ground with cold methanol in a mortar and again collected by suction to give the white solid dimer which weighed 479 grams, corresponding to a yield of 72.8 percent of theory. The thus-prepared bicyclo[2.2.1]-2-heptene nitrosochloride was converted to its oxime as follows. A suspension of 94.9 grams of bicyclo[2.2.1]-2-heptene nitrosochloride in 900 milliliters of n-butanol was refluxed at atmospheric pressure for 35 minutes. The solution became greenish-blue upon reaching the reflux temperature indicating the formation of monomeric nitrosochloride, and then faded through green to yellow. The solvent was removed by vacuum distillation leaving an amber-colored sirup. This sirup was dissolved in ethyl ether, and the resulting solution was filtered. The ether was evaporated and the remaining solid was redissolved in hot hexane. This solution, which was filtered while hot, deposited crystals when cooled. These crystals were dissolved in ethyl acetate and recrystallized yielding a white solid with melting point 105–107° C. The product weighed 70.2 grams, corresponding to a yield of 74 percent of the theoretical.

Analysis:

|  | N | Cl |
| --- | --- | --- |
| Calculated | 8.78 | 22.21 |
| Found | 8.96 | 21.86 |

The structure was confirmed by infrared spectral analysis.

The compounds of the present invention are useful as pesticides. The term "pesticide" as used herein is meant to refer to compounds having activity against at least one member of the group of pests comprised of insects, nematodes, and mites.

Protection against pests is achieved by applying a compound of this invention to the area to be protected. Thus, for example, when used as insecticides, the compounds of this invention can be applied to plants and when used as nematocides, they can be incorporated into the soil. Protective action is achieved by killing the pest involved.

The compounds of this invention can be applied as pesticides in admixture with an inert carrier. This carrier may be a liquid, to form sprays, or a solid, to form dusts. Liquid sprays may be readily prepared by dissolving one of the compounds of this invention in a water-soluble solvent, such as acetone, and mixing the resulting solution into a larger volume of water, thereby throwing the pesticide out of solution in a finely divided, substantially colloidal condition. Liquid sprays may also be prepared by dissolving one of the compounds of this invention in an organic solvent, such as acetone, toluene, xylene, kerosene, or mixtures thereof and dispersing the dissolved pesticide in water by utilizing a suitable surface active dispersing agent such as "Triton X–100," condensation product of alkylene oxides and organic acids, "Tergitol NPX," a proprietary non-ionic alkyl phenyl polyethylene glycol ether, "Toximul 500," an alkyl aryl sulfonate, and "Hyamine 1622," a quaternary ammonium compound. Generally, the concentration of the dispersing agent is from 0.1% to 10% by weight of the toxicant. The preferred concentration of active pesticide is from about 0.03% to 10% by weight of final spray.

In the preparation of dusts or wettable powders, the active pesticide compound in finely divided form or a solution of the pesticide in a volatile solvent may be mixed into an inert particulate extender, such as clay, talc, chalk, bentonite, fuller's earth and the like. The volatilization of the solvent desposits the pesticide in and on the extender in finely divided form. When formulating a wettable powder, one or more of the above-mentioned dispersing agents may be added and, if desirable, a wetting agent such as "Tergitol 7," a formulation of sodium heptadecyl sulfate, may also be included. The combined amount of dispersing and wetting agents may vary broadly, but is usually from about 0.5% to about 15% by weight of the final dust or powder.

In the following series of examples, compounds representative of the present invention were evaluated as insecticides, nematocides, and miticides. The following compounds were tested.

No. 1—Bicyclo[2.2.1]heptan-2-one N-methylcarbamyloxime
No. 2—3-chlorobicyclo[2.2.1]heptan-2-one N-methylcarbamyloxime
No. 3—3-methylbicyclo[2.2.1]heptan-2-one N-methylcarbamyloxime
No. 4—3-chloro-5(6)-methylbicyclo[2.2.1]heptan-2-one N-methylcarbamyloxime
No. 5—3-chloro-5(6)-methoxybicyclo[2.2.1]heptan-2-one-N-methylcarbamyloxime
No. 6—3-chloro-5(6)-isobutoxybicyclo[2.2.1]heptan-2-one N-methylcarbamloxime
No. 7—3-chloro-5(6)-cyanobicyclo[2.2.1]heptan-2-one N-methylcarbamloxime
No. 8—3-chloro-5(6)-chloromethylbicyclo[2.2.1]-heptan-2-one N-methylcarbamyloxime
No. 9—3-chloro-5(6)-methylmercaptobicyclo[2.2.1]heptan-2-one N-methylcarbamyloxime
No. 10—3-methylmercaptobicyclo[2.2.1]heptan-2-one-N-methylcarbamyloxime
No. 11—3-isopropylmercaptobicyclo[2.2.1]heptan-2-one-N-methylcarbamyloxime
No. 12—3-(4-chlorophenylmercapto)bicyclo[2.2.1]-heptan-2-one N-methylcarbamyloxime
No. 13—3-ethylmercaptobicyclo[2.2.1]heptan-2-one-N-methylcarbamyloxime
No. 14—3-chloro-5(6)-isopropylbicyclo[2.2.1]heptan-2-one-N-methylcarbamyloxime
No. 15—3-chloro-5(6)-vinylbicyclo[2.2.1]heptan-2-one-N-methylcarbamyloxime
No. 16—3-chloro-5(6)-phenylbicyclo[2.2.1]heptan-2-one-N-methylcarbamyloxime
No. 17—3-dimethylaminobicyclo[2.2.1]heptan-2-one N-methylcarbamyloxime
No. 18.—3-chloro-5(6)-carboxybicyclo[2.2.1]heptan-2-one-N-methylcarbamyloxime
No. 19—3-chloro-5,5(6,6)-dimethylbicyclo[2.2.1]-heptan-2-one N-methylcarbamyloxime
No. 20—3-(N-methylthiocarbamylmercapto)bicyclo-[2.2.1]heptan-2-one N-methylcarbamyloxime
No. 21—3-(N,N-dimethylthiocarbamylmercapto)-bicyclo[2.2.1]heptan-2-one-N-methylcarbamyloxime
No. 22—3-thiocyanatobicyclo[2.2.1]heptan-2-one-N-methylcarbamyloxime
No. 23—3-chlorobocyclo[2.2.1]-5-hepten-2-one N-methylcarbamyloxime.

Unless otherwise noted, suspensions of compounds 1–23 were prepared by dissolving one gram of compound in 50 milliliters of acetone in which had been dissolved 0.1 gram (10 percent of the weight of compound) of "Triton X–155," an alkylphenoxy polyethoxyethanol surfactant, as an emulsifying or dispersing agent. The resulting solution was mixed into 200 milliliters of water to give roughly 250 milliliters of a suspension containing the compound in finely divided form. The thus-prepared stock suspension contained 0.4 percent by weight of compound. The test concentrations employed in the tests described hereinbelow were obtained by diluting the stock suspension with water.

The compounds were evaluated for activity against the following pests: bean aphid, armyworm, Mexican bean beetle, house fly, two-spotted mite, and root-knot nematode.

The tests employed were:

*Aphid foliage spray test*

*Test insect.*—Adults and nymphal stages of the bean aphid (*Aphis fabae* Scop.), reared on potted dwarf nasturtium plants at 65–70° F. and 50–70 percent relative humidity, constituted the test insects. For testing purposes, the number of aphids per pot was standardized to 100–150 by trimming plants containing excess aphids.

*Concentration of toxicant.*—The test compounds were formulated by diluting the stock suspension with water to give a suspension containing 1000 parts of test compound per million parts of final formulation (by weight).

*Application of toxicant.*—The potted plants (one pot per compound tested), infested with 100–150 aphids, were placed on a revolving turntable and sprayed with 100–110 milliliters of test compound formulation by use of a De Vilbiss spray gun set at 40 p.s.i.g. air pressure. This application, which lasted 30 seconds, was sufficient to wet the plants to run-off. As a control, 100–110 milliliters of a water solution containing acetone and emulsifier in the same concentrations as the test compound formulation, but containing no test compound, were also sprayed on infested plants.

*Holding conditions.*—After spraying, the pots were placed on their sides on a sheet of white standard mimeograph paper which had been previously ruled into squares to facilitate counting. Temperature and humidity in the test room during the 24-hour holding period were 80±5° F. and 50±5 percent, respectively.

*Record of results.*—Aphids which fell onto the paper and were unable to remain standing after being uprighted were considered dead. Aphids remaining on the plants were observed closely for movement and those which were unable to move the length of the body upon stimulation by prodding were considered dead. Each compound was rated according to the following numerical designations:

5=80–100% mortality
3=40–79% mortality
1=0–39% mortality

*Armyworm leaf dip test*

*Test insect.*—Larvae of the southern armyworm (*Prodenis eridania,* Cram.), reared on Tendergreen bean plants at a temperature of 80±5° F. and a relative humidity of 50±5 percent, constituted the test insects. The test larvae were removed from the colony and held without food for four hours prior to the test.

*Concentration of toxicants.*—The test compounds were formulated by diluting the stock suspension with water to give a suspension containing 1000 parts of test compound per million parts of final formulation (by weight).

*Application of toxicants.*—Paired seed leaves, excised from Tendergreen bean plants, were dipped in the test formulations until thoroughly wetted, excess liquid being removed by gentle shaking. While the leaves were drying in a ventilated hood, wilting was prevented by placing the stems in water. When dry, the paired leaves were separated and each one was placed in a 9-centimeter Petri dish lined with filter paper. Four randomly selected larvae were introduced into each dish and the dishes were closed.

*Holding conditions.*—The closed dishes were labeled and held at 80–85° F. for three days. Although the larvae could easily consume the whole leaf within twenty-four hours, no more food was added.

*Record of results.*—Larvae which were unable to move the length of the body, even upon stimulation by prodding, were considered dead. Each compound was rated according to the following designations:

5=80–100% mortality
3=40–79% mortality
1=0–39% mortality

Mexican bean beetle leaf dip test

*Test insect.*—Third instar larvae of the Mexican bean beetle (*Epilachna varivestis,* Muls.), reared on Tendergreen bean plants at a temperature of 80±5° F. and 50±5 percent relative humidity, were the test insects.

*Concentration of toxicant.*—The test compounds were formulated by diluting the stock suspension with water to give a suspension containing 1000 parts of test compound per million parts of final formulation by weight.

*Application of toxicant.*—Paired seed leaves excised from Tendergreen bean plants were dipped in the test formulation until thoroughly wetted, excess liquid being removed by gentle shaking. While the leaves were drying under a hood, wilting was prevented by placing the stems in water. When dry, the paired leaves were separated and each was placed in a 9-centimeter Petri dish lined with filter paper. Four randomly selected larvae were introduced into each dish, and the dishes were closed.

*Holding conditions.*—The closed dishes were labeled and held at a temperature of 80±5° F. for three days. Although the larvae could easily consume the leaf within 24 to 48 hours, no more food was added.

*Record of results.*—Larvae which were unable to move the length of the body, even upon stimulation, were considered dead. Each compound was rated according to the following designations:

5=80–100% mortality
3=40–79% mortality
1=0–39% mortality

Fly bait test

*Test insect.*—4–6 day old adult house flies (*Musca domestica,* L.), reared according to the specifications of the Chemical Specialties Manufacturing Association (Blue Book, MacNair-Dorland Co., N.Y., 1954, pages 243–244, 261) under controlled conditions of 80±2° F. and 50±5 percent relative humidity, were the test insects. The flies were immobilized by anesthetizing with carbon dioxide and twenty-five immobilized individuals, males and females, were transferred to a cage consisting of a standard food strainer about five inches in diameter which was inverted over blotting paper.

*Concentration of toxicant.*—The test compounds were formulated by diluting the stock suspension with a 10 percent (by weight) sugar solution to give a suspension containing 1000 parts of test compound per million parts of final formulation, by weight.

*Application of toxicant.*—Fifteen milliliters of the test formulation were added to a soufflé cup containing a one-inch square of an absorbent pad. This bait cup was introduced and centered on the blotting paper under the food strainer prior to admitting the flies.

*Holding conditions.*—The caged flies were allowed to feed on the bait for twenty-four hours, at a temperature of 80±5° F. and relative humidity of 50±5 percent.

*Record of results.*—Flies which showed no sign of movement on prodding were considered dead. Each compound was rated according to the following designations:

5=80–100% mortality
3=40–79% mortality
1=0–39% mortality

Mite foliage spray test

*Test organism.*—Adults and nymph stages of the two-spotted mite (*Tetranychus telarium* L.), reared on Tendergreen bean plants at 80±5° F. and 50±5 percent relative humidity, were the test organisms. Infested leaves from a stock culture were placed on the primary leaves of two bean plants six to eight inches in height, growing in a two and a half inch clay pot. 150–200 mites, a sufficient number for testing, transferred from the excised leaves to the fresh plants in a period of twenty-four hours. Following the twenty-four hour transfer period, the excised leaves were removed from the infested plants.

*Concentration of toxicant.*—The test compounds were formulated by diluting the stock suspension with water to give a suspension containing 2500 parts of test compound per million parts of final formulation.

*Application of toxicant.*—The potted plants (one pot per compound) were placed on a revolving turntable and sprayed with 100–110 milliliters of test compound formulation by use of a De Vilbiss spray gun set at 40 p.s.i.g. air pressure. This application, which lasted 30 seconds, was sufficient to wet the plants to run-off. As a control, 100–110 milliliters of a water solution containing acetone and emulsifier in the same concentrations as the test compound formulation, but containing no test compound, were also sprayed on infested plants.

*Holding conditions.*—The sprayed plants were held at 80±5° F. and 50±5 percent relative humidity for four days, after which a mortality count of motile forms was made.

*Record of results.*—Microscopic examination for motile forms was made on the leaves of the test plants. Any individual which was capable of locomotion upon prodding was considered living. Each compound was then rated according to the following designations.

5=80–100% mortality
3=40–79% mortality
1=0–39% mortality

Nematocide test

*Test organism.*—Infective migratory larvae of the root-knot nematode (*Meloidogyne incognita,* var. *acrita*), reared in the greenhouse on roots of Rutgers variety tomato plants constituted the test organism. Infected tomato plants were removed from the culture and the roots were chopped very finely. A small amount of these choppings were added to a pint Mason jar containing approximately 180 cubic centimeters of composted loam soil. The jar was capped and incubated for one week at room temperature. During the incubation period eggs of the nematode hatch and the larval forms migrate into the soil.

*Concentration of toxicant.*—The test compounds were formulated by diluting the stock suspension with water to give a suspension containing 2000 parts of test compound per million parts of final formulation.

*Application of toxicant.*—Twenty-five milliliters of the test formulation were added to each of two jars. Thus each jar contained 50 milligrams of test compound, an amount roughly equivalent to 375 pounds per acre. Following the introduction of the test formulation, the jars were capped and the contents thoroughly mixed on a ball mill for five minutes.

*Holding conditions.*—The jars remained capped at room temperature for 48 hours whereupon the contents were transferred to 3-inch pots. These pots were then seeded with melon or cucumber as an indicator crop and placed in the greenhouse where they were cared for in the usual fashion for approximately three weeks.

*Record of results.*—The melon or cucumber plants were removed from the pots and the soil was washed from the roots. The amount of galling was determined by visual inspection and rated according to the following designations:

5=no galling; perfect control
 4=very light galling
 3=light galling
 2=moderate galling
 1=severe galling, equal to untreated plants The results of the above-described tests are set forth in Table I, below.

The controls exhibited no pesticidal activity.

TABLE I

| Compound | Biological Evaluation | | | | | |
|---|---|---|---|---|---|---|
| | Aphid | Army Worm | Mexican Bean Beetle | Fly Bait | Mite (Motile Forms) | Root-knot Nematode |
| 1 | 5 | | | 5 | 5 | 5 |
| 2 | 5 | 5 | 5 | 5 | 5 | 5 |
| 3 | | | | 3 | 5 | |
| 4 | 5 | | 5 | 5 | 5 | |
| 5 | 5 | 5 | | 5 | 5 | |
| 6 | 5 | 3 | 3 | 5 | 3 | |
| 7 | 5 | | 5 | 5 | 5 | |
| 8 | | | | 3 | 5 | |
| 9 | 5 | | | 3 | 5 | |
| 10 | 5 | 5 | 5 | 5 | 5 | |
| 11 | | | 5 | | | |
| 12 | | 3 | 5 | | 3 | |
| 13 | | | | | | 4 |
| 14 | | | | | 5 | |
| 15 | 5 | | 3 | 5 | | 5 |
| 16 | | | | | 3 | |
| 17 | | | 3 | | | |
| 18 | | | | 5 | | |
| 19 | | | 5 | 5 | 3 | 3 |
| 20 | | | 3 | | 3 | |
| 21 | | | 3 | | 3 | |
| 22 | 3 | | | 3 | 3 | |
| 23 | 5 | | 3 | 5 | 5 | 5 |
| Concentration [1] | 1,000 | 1,000 | 1,000 | 1,000 | 2,500 | 2,000 |

[1] In parts of compound per million parts of final, applied formulation, by weight.

Compound No. 7, 3-chloro-5(6)-cyanobicyclo[2.2.1]-heptan-2-one N-methylcarbamyloxime, was further evaluated as a miticide by determining the concentration of compound required to kill 50 percent of the mites, employing the procedure described above under "mite foliage spray test." It was found that application of a suspension containing only 36 parts of compound per million parts of suspension resulted in 50 percent kill.

Apart from the distinctive pesticidal action of the compounds herein disclosed, the compounds of this invention are also useful as fungicides and bactericides and may find application as modifiers in resin manufacture and in the field of surfactants.

What is claimed is:

1. Compounds of the formula

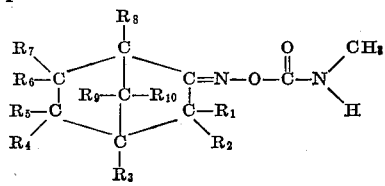

and wherein $R_1$ is selected from the group consisting of hydrogen, chlorine, lower alkyl, dimethylamino, N-methylthiocarbamylmercapto, N,N - dimethylthiocarbamylmercapto, thiocyanato, and alkylmercapto of from 1 to 4 carbon atoms; $R_2$, $R_4$, $R_6$, $R_9$ and $R_{10}$ are selected from the group consisting of hydrogen, chlorine, and lower alkyl; $R_3$ and $R_8$ are selected from the group consisting of hydrogen, chlorine, lower alkyl, alkoxy of from 1 to 4 carbon atoms, cyano, and alkylmercapto from 1 to 4 carbon atoms; and $R_5$ and $R_7$ are selected from the group consisting of hydrogen, chlorine, lower alkyl, lower alkenyl, chloroalkyl, alkoxy of from 1 to 4 carbon atoms, cyano, alkylmercapto of from 1 to 4 carbon atoms, phenyl, parachlorophenyl, and carboxy.

2. Compounds of the formula

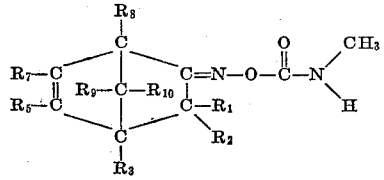

wherein $R_1$ is selected from the group consisting of hydrogen, chlorine, lower alkyl, dimethylamino, N-methylthiocarbamylmercapto, N,N - dimethylthiocarbamylmercapto, thiocyanato, and alkylmercapto of from 1 to 4 carbon atoms, $R_2$, $R_9$ and $R_{10}$ are selected from the group consisting of hydrogen, chlorine, and lower alkyl; $R_3$ and $R_8$ are selected from the group consisting of hydrogen, chlorine, lower alkyl, alkoxy of from 1 to 4 carbon atoms, cyano, and alkylmercapto of from 1 to 4 carbon atoms; and $R_5$ and $R_7$ are selected from the group consisting of hydrogen, chlorine, lower alkyl, lower alkenyl, chloroalkyl, alkoxy of from 1 to 4 carbon atoms, cyano, alkylmercapto of from 1 to 4 carbon atoms, phenyl, parachlorophenyl and carboxy.

3. Bicyclo[2.2.1]heptan-2-one N-methylcabamyloxime.

4. 3-chlorobicyclo[2.2.1]heptan - 2 - one N-methylcarbamyloxime.

5. 3-chloro-6 - methylbicyclo[2.2.1]heptan - 2 - one N-methylcarbamyloxime.

6. 3-chloro-6-methoxybicyclo[2.2.1]heptan - 2 - one N-methylcarbamyloxime.

7. 3-chloro-5-cyanobicyclo[2.2.1]heptan-2-one N-methylcarbamyloxime.

8. 3-chloro-6-cyanobicyclo[2.2.1]heptan-2-one N-methylcarbamyloxime.

9. 3-chlorobicyclo[2.2.1]-5-hepten-2-one N-methylcarbamyloxime.

10. 3,6-dichlorobicyclo[2.2.1]heptan-2-one N-methylcarbamyloxime.

11. The process for making carbamyloxime compound of the formula:

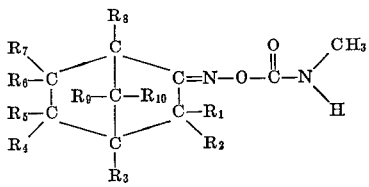

and wherein $R_1$ is selected from the group consisting of hydrogen, chlorine, lower alkyl, dimethylamino, N-methylthiocarbamylmercapto, N,N-dimethylthiocarbamylmercapto, thiocyanato, and alkylmercapto of from 1 to 4 carbon atoms; $R_2$, $R_4$, $R_6$, $R_9$ and $R_{10}$ are selected from the group consisting of hydrogen, chlorine, and lower alkyl; $R_3$ and $R_8$ are selected from the group consisting of hydrogen, chlorine, lower alkyl, alkoxy of from 1 to 4 carbon atoms, cyano, and alkylmercapto of from 1 to 4 carbon atoms and $R_5$ and $R_7$ are selected from the group consisting of hydrogen, chlorine, lower alkyl, lower alkenyl, chloroalkyl, alkoxy of from 1 to 4 carbon atoms, cyano, alkylmercapto of from 1 to 4 carbon atoms, phenyl, parachlorophenyl and carboxy; which process comprises contacting the corresponding oxime with methylisocyanate in a mol ratio of methylisocyanate to oxime of from about 0.25:1 to about 2:1 in an inert solvent at a temperature of from about 10° C. to about 130° C. and a pressure of from about 1 atmosphere to about 10 atmospheres.

12. The process for making carbamyloxime compounds of the formula:

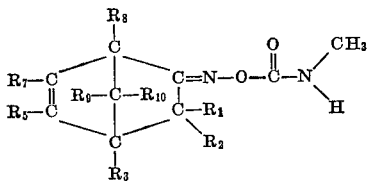

wherein $R_1$ is selected from the group consisting of hydrogen, chlorine, lower alkyl, dimethylamino, N-methylthiocarbamylmercapto, N,N-dimethylthiocarbamylmercapto, thiocyanato, and alkylmercapto of from 1 to 4 carbon atoms, $R_2$, $R_9$, and $R_{10}$ are selected from the group consisting of hydrogen, chlorine, and lower alkyl $R_3$ and $R_8$ are selected from the group consisting of hydrogen, chlorine, lower alkyl, alkoxy of from 1 to 4 carbon atoms, cyano, and alkylmercapto of from 1 to 4 carbon atoms and $R_5$ and $R_7$ are selected from the group consisting of hydrogen, chlorine, lower alkyl, lower alkenyl, chloroalkyl, alkoxy of from 1 to 4 carbon atoms, cyano, alkylmercapto, phenyl, parachlorophenyl and carboxy; which process comprises contacting the corresponding oxime with methylisocyanate in a mol ratio of methylisocyanate to oxime of from about 0.25:1 to about 2:1 in an inert solvent at a temperature of from about 10° C. to about 130° C. and a pressure of from about 1 atmosphere to about 10 atmospheres.

13. The process for preparing 3-chloro-6-cyanobicyclo[2.2.1]heptan-2-one N-methylcarbamyloxime which comprises contacting 3-chloro-6-cyanobicyclo[2.2.1]heptan-2-one oxime with methyl isocyanate in a mol ratio of methyl isocyanate to oxime of from about 0.25:1 to about 2:1 in an inert solvent at a temperature of from about 10° C. to about 130° C. and a pressure of from about 1 atmosphere to about 10 atmospheres.

References Cited by the Examiner

UNITED STATES PATENTS

| | | | |
|---|---|---|---|
| 2,761,806 | 9/1956 | Boyer | 167—30 |
| 2,862,953 | 12/1958 | Abe et al. | 260—464 |
| 2,899,462 | 8/1959 | Bavley et al. | 260—614 |
| 2,901,498 | 8/1959 | Tilles et al. | 260—455 |
| 2,903,482 | 9/1959 | Hopff et al. | 260—566 |
| 2,939,875 | 6/1960 | Floria | 260—454 |

OTHER REFERENCES

Georghiu: Bull. Soc. Chim. France, 4th series, vol. 49 (1931), pp. 1205–1210.

Petersen: Ann. der Chemie, 562, pp. 205–209 (1949).

Zinner: C. A., 53, page 13999 (1959).

CHARLES B. PARKER, *Primary Examiner.*